United States Patent
Ko et al.

(10) Patent No.: US 9,358,683 B2
(45) Date of Patent: Jun. 7, 2016

(54) WIRE-DRIVEN ROBOT

(71) Applicant: Hyundai Motor Company, Seoul (KR)

(72) Inventors: Hun Keon Ko, Seoul (KR); Joo Young Chun, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 162 days.

(21) Appl. No.: 14/325,765

(22) Filed: Jul. 8, 2014

(65) Prior Publication Data

US 2015/0165621 A1   Jun. 18, 2015

(30) Foreign Application Priority Data

Dec. 18, 2013   (KR) .................. 10-2013-0158789

(51) Int. Cl.
*B25J 9/10* (2006.01)
*B25J 18/00* (2006.01)
*B25J 9/00* (2006.01)

(52) U.S. Cl.
CPC ............... *B25J 9/104* (2013.01); *B25J 9/0006* (2013.01); *B25J 9/1045* (2013.01); *Y10T 74/20323* (2015.01)

(58) Field of Classification Search
CPC ................................ B25J 9/104; B25J 9/0006
See application file for complete search history.

(56) References Cited

U.S. PATENT DOCUMENTS

| | | | | |
|---|---|---|---|---|
| 5,624,398 A * | 4/1997 | Smith | ............... | A61B 19/22 604/95.01 |
| 6,668,678 B1 * | 12/2003 | Baba | ............... | B25J 9/104 414/680 |
| 2006/0161220 A1 * | 7/2006 | Kobayashi | ............ | A61F 5/0102 607/49 |
| 2012/0172769 A1 * | 7/2012 | Garrec | ............... | A61F 5/013 601/33 |
| 2015/0119998 A1 * | 4/2015 | Garrec | ............... | B25J 9/0006 623/57 |
| 2015/0165622 A1 * | 6/2015 | Ko | ............... | B25J 9/0006 414/7 |
| 2015/0272811 A1 * | 10/2015 | Choi | ............... | B25J 17/00 623/27 |

FOREIGN PATENT DOCUMENTS

| | | |
|---|---|---|
| JP | H07-204233 A | 8/1995 |
| JP | 2010-220786 A | 10/2010 |
| JP | 2012-239818 A | 12/2012 |
| KR | 10-2012-0059305 | 6/2012 |
| KR | 10-2012-0105890 | 9/2012 |
| KR | 10-2012-0122054 | 11/2012 |
| KR | 10-2013-0106970 A | 10/2013 |

* cited by examiner

*Primary Examiner* — Terence Boes
(74) *Attorney, Agent, or Firm* — Mintz Levin Cohn Ferris Glovsky and Popeo, P.C.; Peter F. Corless

(57) ABSTRACT

A wire-driven robot includes pairs of arm parts including shoulder joints, elbow joints, and wrist joints to move with a motion of a wearer; a shoulder wire connected with the pair of shoulder joints; a shoulder driving unit applying a rotational force to the shoulder joints by winding or unwinding the shoulder wire in link with the motion of the wearer; an elbow wire connected with the pair of elbow joints; an elbow driving unit applying a rotational force to the elbow joints by winding or unwinding the elbow wire in link with the motion of the wearer; a wrist wire connected to the pair of wrist joints; and a wrist driving unit applying a rotational force to the wrist joints by winding or unwinding the wrist wire in link with the motion of the wearer.

8 Claims, 4 Drawing Sheets

WIRE-DRIVEN ROBOT

CROSS-REFERENCE(S) TO RELATED APPLICATION

The present application claims under 35 U.S.C. §119(a) the benefit of Korean Patent Application Number 10-2013-0158789 filed on Dec. 18, 2013, which is incorporated by reference herein in its entirety.

BACKGROUND (a) Technical Field

The present invention relates to a wire-driven robot, and more particularly, to a wire-driven robot that can drive a plurality of joints using a small number of driving devices through a wire.

(b) Description of the Related Art

In a structure of a robot, the number of joints is proportional to the weight of the robot. When the number of joints is increased, the number of driving devices for driving each joint is increased, and as a result, the total weight of the robot is increased. In particular, a wearable robot is designed in such manner that a worker performs work by operating the robot while the worker wears the robot in person and when the weight of robot is increased, a load which a wearer needs to bear is increased, and as a result, the wearer may suffer from fatigue, and working efficiency deteriorates when the wearable robot performs the work for a long time.

A robot in the related art has a plurality of joints for driving, however, the driving device is provided for each joint, and as a result, the total weight of robot is increased, thereby reducing the working efficiency of a worker.

The description provided above as a related art of the present invention is just for helping in understanding the background of the present invention and should not be construed as being included in the related art known by those skilled in the art.

SUMMARY

The present invention provides a wire connected with a plurality of joints (instead of providing a driving device for each joint), and a driving device is provided to wind or unwind the wire to apply rotational force to each joint without driving the driving device for each joint.

In one aspect, the present invention provides a wire-driven robot including: pairs of arm parts including shoulder joints, elbow joints, and wrist joints to move with the motion of a wearer; a shoulder wire connected to the pair of shoulder joints; a shoulder driving unit applying rotational force to the shoulder joints by winding or unwinding the shoulder wire in link with the motion of the wearer; an elbow wire connected to the pair of elbow joints; an elbow driving unit applying a rotational force to the elbow joints by winding or unwinding the elbow wire in link with the motion of the wearer; a wrist wire connected to the pair of wrist joints; and a wrist driving unit applying a rotational force to the wrist joints by winding or unwinding the wrist wire in link with the motion of the wearer.

Both ends of each wire may be connected to a pair of joints corresponding thereto, respectively, and the respective driving units may be connected between both ends of the wires corresponding thereto to wind or unwind the wires corresponding thereto.

The wire-driven robot may further include a supporting body of which both sides are rotatably joined with a pair of arm parts, and each driving unit may be fixed to the supporting body.

Each driving unit may unwind a corresponding wire when the wearer rotates the joint corresponding to each driving unit in an opposite direction to a winding direction of the corresponding wire.

Each driving unit may wind a corresponding wire when the wearer rotates the joint corresponding to each driving unit in a direction which coincides with the winding direction of the corresponding wire.

The wire-driven robot may further include: a tension detecting unit provided between one end and the other end of each wire for each wire and detecting the tension of a corresponding wire; and a controller actuating a corresponding driving unit to wind or unwind a corresponding wire to allow the corresponding wire to keep a predetermined reference tension when a joint connected to the wire corresponding to each tension detecting unit pivots to change the tension of the corresponding wire.

Each tension detecting unit may include a driving unit-side suspension portion of which one end is connected to the driving unit corresponding to each tension detecting unit; an arm part-side suspension portion of which one end is connected between both ends of a wire corresponding to each tension detecting unit and the other end is suspended and joined with the corresponding driving unit-side suspension portion; and a pressure sensor provided at a portion where the driving unit-side suspension portion and the arm part-side suspension portion contact each other to detect the pressing force applied to a contact surface.

In another aspect, the present invention further provides a wire-driven robot system, wherein pairs of arm parts include shoulder joints, elbow joints, and wrist joints to move with a motion of a wearer; a shoulder wire is connected to the pair of shoulder joints; a shoulder driving unit is in link with a motion of the wearer so as to apply a rotational force to the shoulder joints by winding or unwinding the shoulder wire; an elbow wire is connected to the pair of elbow joints; an elbow driving unit is in link with a motion of the wearer so as to apply a rotational force to the elbow joints by winding or unwinding the elbow wire; a wrist wire is connected to the pair of wrist joints; and a wrist driving unit is in link with a motion of the wearer so as to apply a rotational force to the wrist joints by winding or unwinding the wrist wire.

According to the wire-driven robot having the aforementioned structure, the total weight of the robot can be reduced by decreasing the number of driving units for driving the robot, and as a result, the burden of a worker is decreased, thereby increasing the work efficiency of the worker.

Further, the number of driving units is decreased to save cost.

BRIEF DESCRIPTION OF THE DRAWINGS

The above and other features of the present invention will now be described in detail with reference to exemplary embodiments thereof illustrating the accompanying drawings which are given herein below by way of illustration only, and thus are not limitative of the present invention, and wherein.

Figure 1:
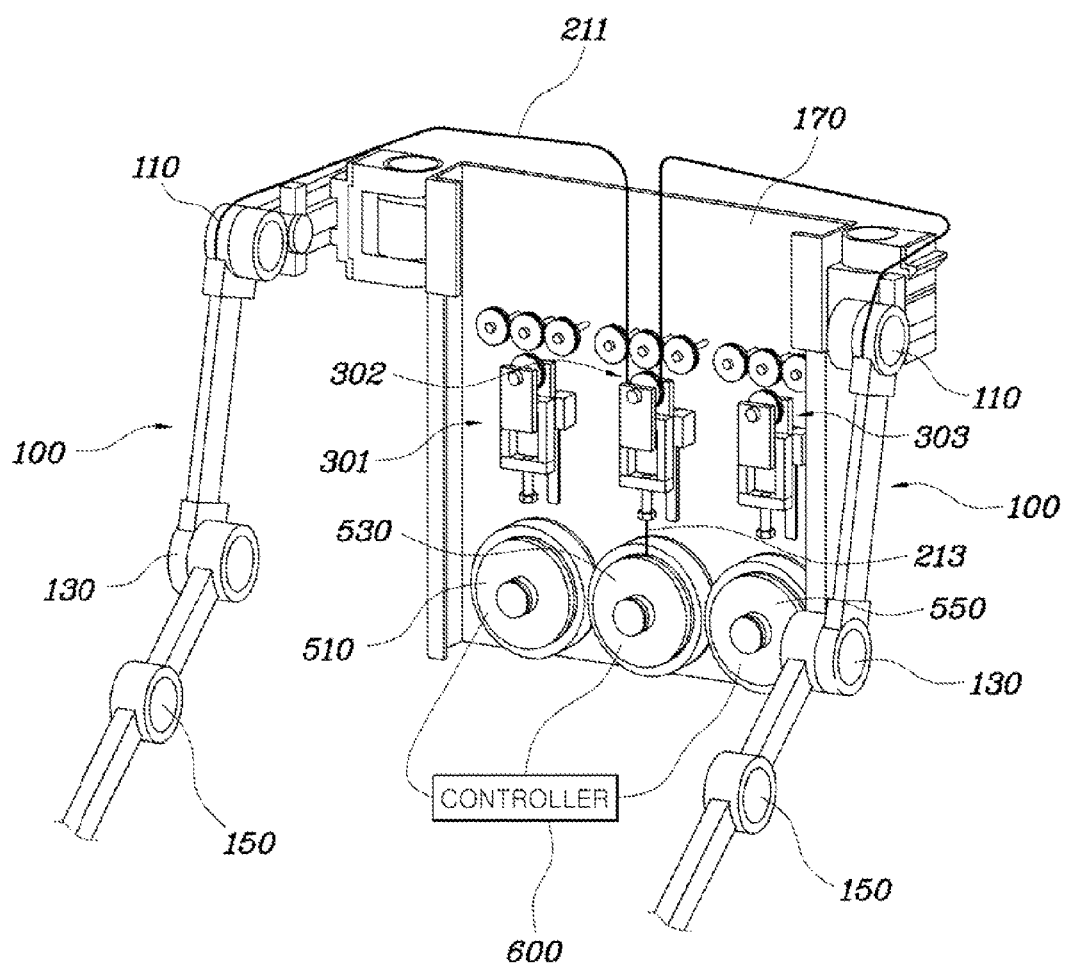
FIG. 1 is a schematic diagram for driving the shoulder wire of a wire-driven robot according to an embodiment of the present invention.

It should be understood that the appended drawings are not necessarily to scale, presenting a somewhat simplified representation of various preferred features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover the exemplary embodiments as well as various alternatives, modifications, equivalents and other embodiments; which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, a wire-driven robot according to a preferred embodiment of the present invention is described with reference to the accompanying drawings.

Figure 2:
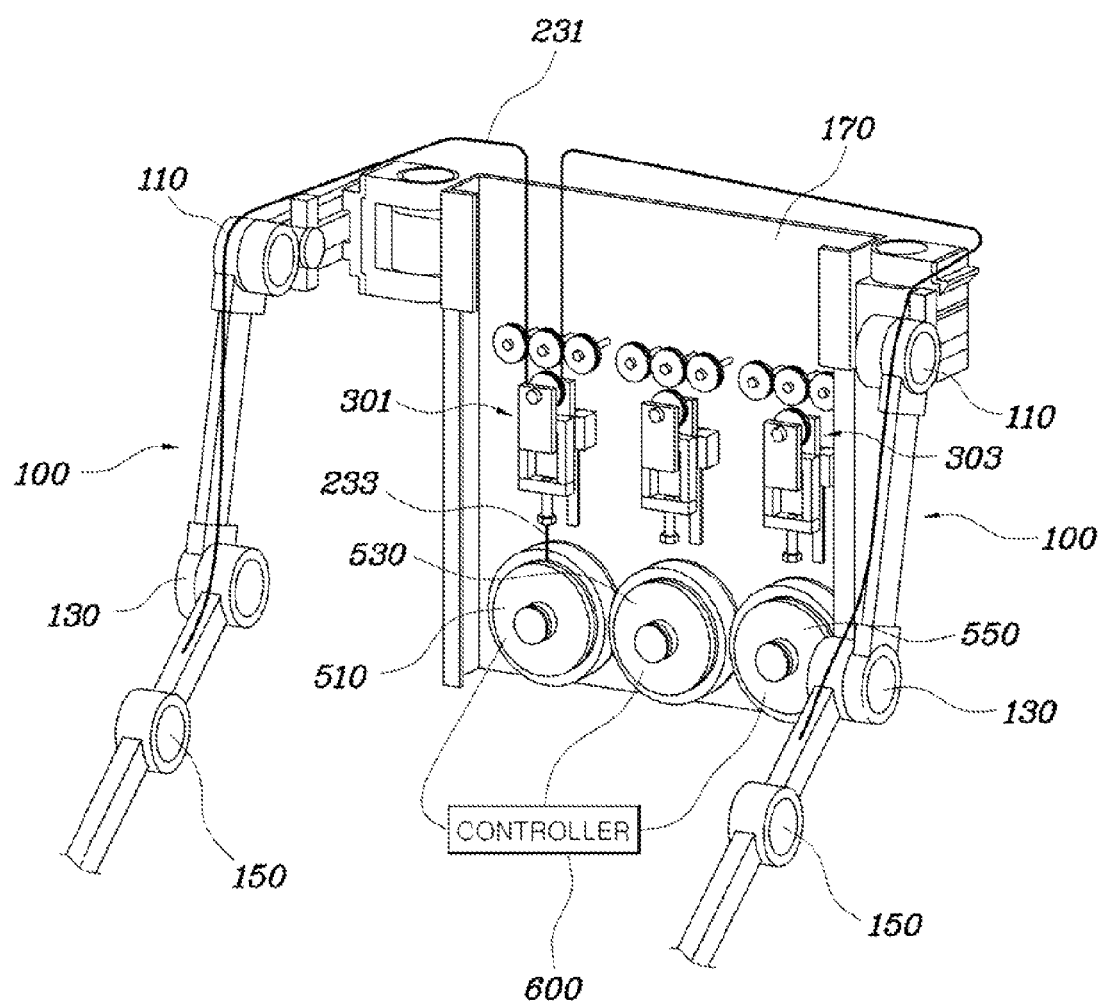
FIG. 2 is a schematic diagram for driving the elbow wire of the wire-driven robot according to an embodiment of the present invention.
Figure 3:
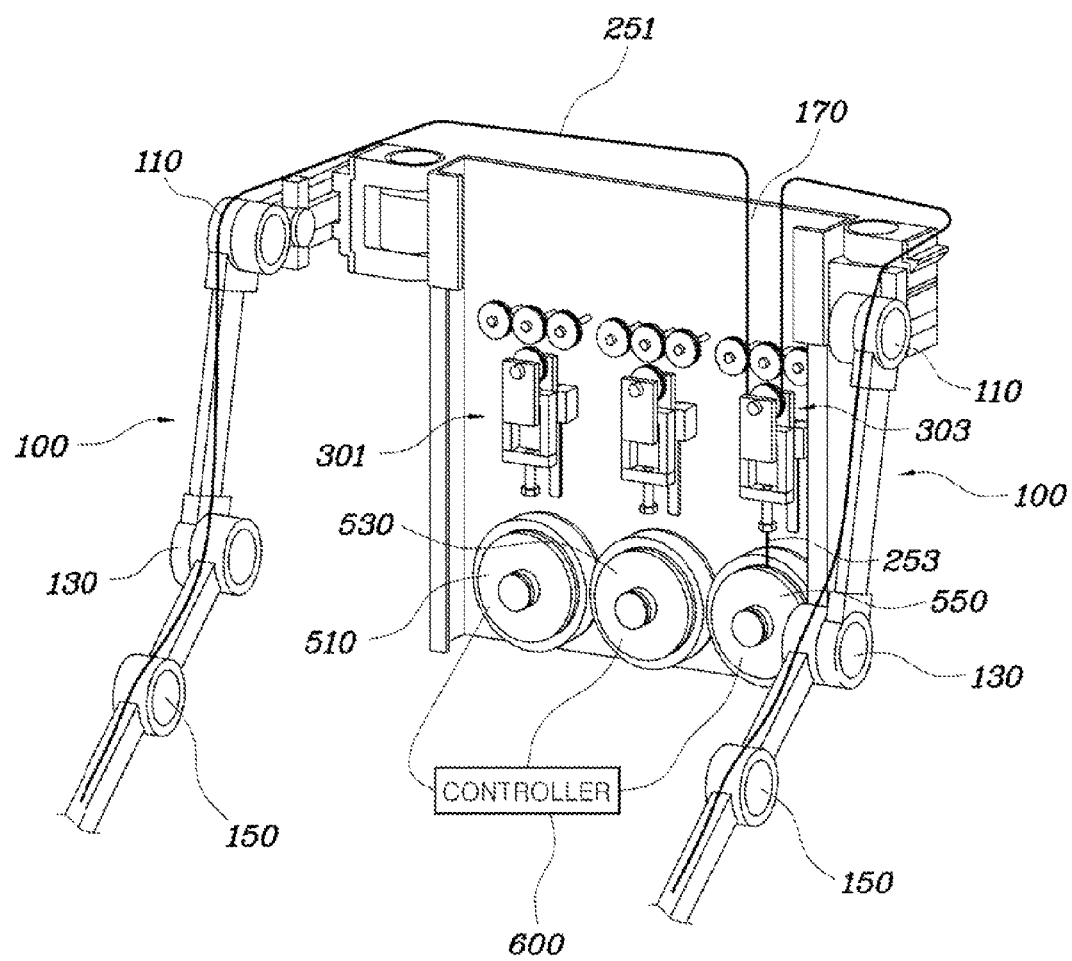
FIG. 3 is a schematic diagram for driving the wrist wire of the wire-driven robot according to an embodiment of the present invention.

FIGS. 1 to 3 are schematic diagrams of a wire-driven robot according to an embodiment of the present invention, and depict pairs of arm parts 100 including shoulder joints 110, elbow joints 130, and wrist joints 150 to operate with the motion of a wearer; a shoulder wire 211 connected to the pair of shoulder joints 110; a shoulder driving unit 510 applying a rotational force to the shoulder joints 110 by winding or unwinding the shoulder wire 211 in link with the motion of the wearer; an elbow wire 231 connected to the pair of elbow joints 130; an elbow driving unit 530 applying a rotational force to the elbow joints 130 by winding or unwinding the elbow wire 231 in link with the motion of the wearer; a wrist wire 251 connected to the pair of wrist joints 150; and a wrist driving unit 550 applying a rotational force to the wrist joints 150 by winding or unwinding the wrist wire 251 in link with the motion of the wearer.

In more detail, the wire-driven robot further includes a supporting body 170 of which both sides are rotatably joined with the pair of arms 100, and each driving unit 510, 530, or 550 is preferably configured to be fixed to the supporting body 170.

The supporting body 170 which is positioned at the rear side of the wearer to face the back of the wearer is supported by the wearer, and the pair of arms 100 is joined to both upper ends of the supporting body 170 to operate together with the arm of the wearer. Herein, the pair of arms 100 moves independently from each other, and the joints 110, 130, and 150 of each arm part 100 are formed to be relatively rotatable among a plurality of links provided in the arm part 100, and a grip portion 160 which may be held by the wearer is provided at an end of the wrist joint 150 of the arm part 100, and as a result, as the wearer moves the arm by holding the grip portion 160, the arm part 100 may move together.

Meanwhile, the driving units 510, 530, and 550 are provided in the supporting body 170, and as a result, a weight concentrates on the back of the wearer and the driving units 510, 530, and 550 are not installed in the arm part 100, thereby decreasing the weight of the arm part 100. Therefore, the wearer feels less fatigue in moving the arm part 100.

Meanwhile, both ends of each wire 211, 231, or 251 are connected to a pair of joints corresponding thereto, respectively, and it is preferable that the respective driving units 510, 530, and 550 are connected between both ends of the wires 211, 231, and 251 corresponding thereto to wind or unwind the wires 211, 231, and 251 corresponding thereto.

In particular, both ends of the shoulder wire 211 are connected to a pair of shoulder joints 110, respectively, via the top of the supporting body 170; both ends of the elbow wire 231 are connected to a pair of elbow joints 130 via the top of the supporting body 170 and the shoulder joint 110; and both ends of the wrist wire 251 are connected to a pair of wrist joints 550 via the top of the supporting body 170, and the shoulder joint 110 and the elbow joint 130.

The rotational force acting direction of the joint by winding the wires 211, 231, and 251 may be changed depending on the position where the corresponding joint each wire 211, 231, or 251 is connected, and as a result, the connected position is preferably decided according to the usage of a robot and the working pattern of a worker.

However, in general, since a wearable robot is manufactured to add assistance force when the worker lifts a heavy weight, each wire 211, 231, or 251 is preferably connected to a corresponding joint according to the rotational direction of the worker's joint. For example, in the case of the elbow joint, since the joint rotates upward, that is, rotates toward the shoulder when the worker lifts the weight, an end of the elbow wire 231 is preferably connected to the elbow joint 130 moving upward.

Meanwhile, a shoulder driving unit wire 213, an elbow driving unit wire 233, and a wrist driving unit wire 253 of which ends are connected with the corresponding wires 211, 231, and 251 are provided in the driving units 510, 530, and 550, respectively, and the shoulder driving unit 510, the elbow driving unit 530, and the wrist driving unit 550 are connected to the driving unit wires 213, 233, and 253, respectively, to serve to wind or unwind the corresponding driving unit wires 213, 233, and 253. Each driving unit 510, 530, or 550 preferably becomes a motor having a rotational shaft.

For example, one end of the shoulder driving unit wire 213 is connected between both ends of the shoulder wire 211, and the other end of the shoulder driving unit wire 213 is connected to the shoulder driving unit 510, and as a result, the shoulder wire 211 is wound or released as the shoulder driving unit wire 213 is wound or unwound.

The respective wires 211, 231, and 251 are connected with the ends of the corresponding driving unit wires 213, 233, and 253, respectively, in a suspension structure to preferably move to be rotatable to the driving unit wires 213, 233, and 253. As a result, a pair of joints 110, 130, and 150 may move differently from each other. The suspension structure will be described below.

Meanwhile, the respective driving units 510, 530, and 550 preferably drive the joints to wind the corresponding wires 211, 231, and 251 when the wearer rotates the joints corresponding to the respective driving units 510, 530, and 550 in directions which coincide with winding directions of the wires 211, 231, and 251.

To this end, the tension of each wire 211, 231, or 251 is detected to sense the rotational direction of corresponding joints 110, 130, and 150 as the tension is increased or decreased, and a controller 600 is preferably provided to control the driving units 510, 530, and 550 by rotation of the joints 110, 130, and 150.

Further, tension detecting units 301, 302 and 303 may be provided at portions where the respective wires 211, 231, and 251 are connected to the ends of the respective corresponding driving unit wires 213, 233, and 253 in order to detect the tension. The tension detecting units 301, 302, and 303 are constituted by a shoulder tension detecting unit 301 detecting tension of the shoulder wire 211, an elbow tension detecting unit 302 detecting the tension of elbow wire 231, and a wrist tension detecting unit 303 detecting the tension of wrist wire 251.

Figure 4:
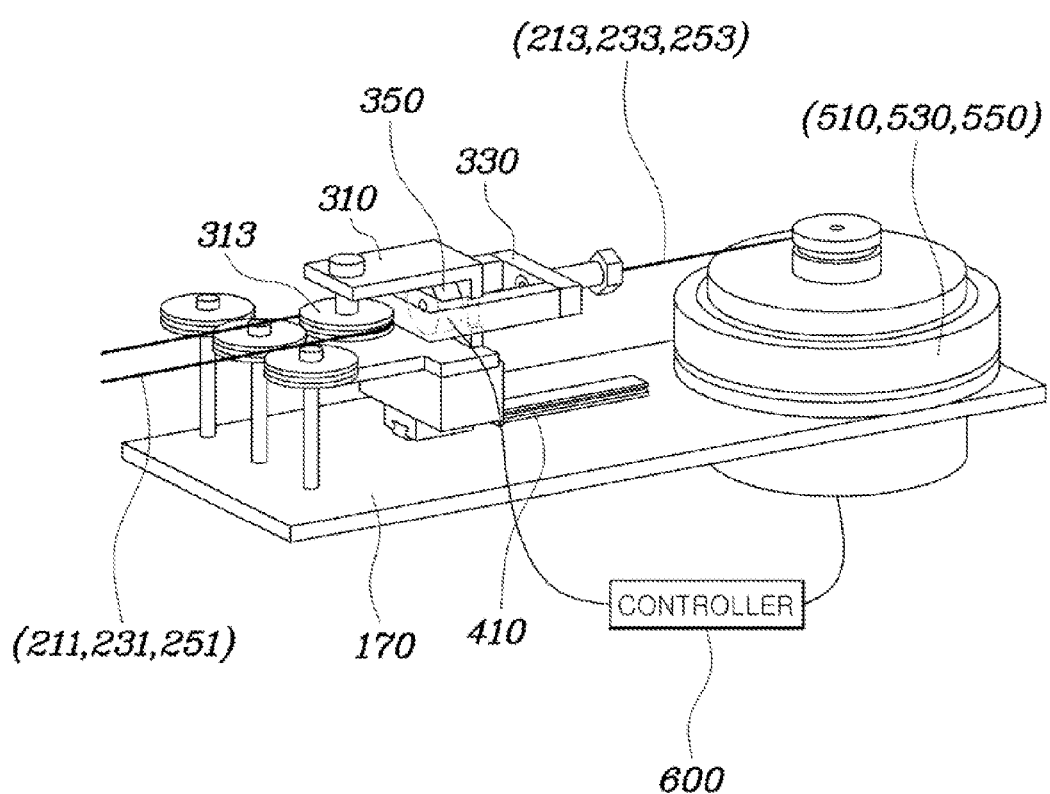
FIG. 4 is a schematic diagram of a tension detecting unit according to an embodiment of the present invention.

When the tension detecting units 301, 302, and 303 are described with reference to FIG. 4, the tension detecting units 301, 302, and 303 are provided to include a driving unit-side suspension portion 330 of which one end is connected to the driving unit wires 213, 233, and 253; an arm part-side suspension portion 310 of which one end is connected with the wires 211, 231, and 251 and the other end is suspended and joined with the driving unit-side suspension portion 330; and a pressure sensor 350 provided at a portion where the driving unit-side suspension portion 330 and the arm part-side suspension portion 310 contact to detect pressing force applied to a contact surface.

The driving unit-side suspension portion 330 and the arm part-side suspension portion 310 bent as panels in a quadrangular ring shape are preferably provided to cross vertically to each other and form the suspension structure with parts of inner surfaces of the other respective ends facing each other. Since the rings are suspended to cross each other, even though the wires 211, 231, and 251 are loosened, the wires 211, 231, and 251 may be arranged without being joined with each other, and the suspension portions are constituted by the panels, and as a result, the suspension portions are provided with a large contact dimension, thereby achieving a stable joining.

Meanwhile, the pressure sensor 350 as a sensor that detects pressure applied to one surface of the pressure sensor 350 may be a load cell.

The pressure sensor 350 is installed on an inner surface of the other end of the driving unit-side suspension portion 330 or the arm part-side suspension portion 310 to measure a tension applied to the driving unit wires 213, 233, and 253 and the wires 211, 231, and 251, and since the driving unit wires 213, 233, and 253 and the wires 211, 231, and 251 are connected through joining the respective suspension portions 310 and 330, the driving unit wires 213, 233, and 253 and the wires 211, 231, and 251 have the same tension and since the inner surface of the other ends of the respective suspension portions 310 and 330 contact each other when the tension is generated in the wires 211, 231, and 251, the pressure sensor 350 provided at the contact position is pressurized in proportion to the tension to detect the tension of the wires 211, 231, and 251.

Meanwhile, a roller 313 is provided at one end of the arm part-side suspension portion 310, and a space between both ends of each wire 211, 231, or 251 may be provided to be suspended on the roller 313. A groove is formed at the center of an outer circumferential surface of the roller 313 to preferably prevent the wire from being removed.

Since both ends of each wire 211, 231, or 251 are connected to different arm parts 100, the same actuating force may be applied to different joints 110, 130, and 150 through the driving units 510, 530, and 550.

Further, each tension detecting unit 301, 302, or 303 is preferably installed in the supporting body 170, and a rail 410 that enables the arm part-side suspension portion 310 to be joined and moved is provided at a position corresponding to the arm part-side suspension portion 310 in the supporting body 170, and the rail 410 is provided in a movement direction of the arm part-side suspension portion 310 and as the driving unit wires 213, 233, and 253 are wound and unwound to the corresponding driving units 510, 530, and 550, the driving unit wires 213, 233, and 253 move on the rail 410.

Hereinafter, cases of the elbow joint 130 and the elbow wire 231 illustrated in FIG. 2 will be described in order to describe an operating process. The same operating process may be applied to each wire 211, 231, or 251, and each driving unit 510, 530, or 550 and each joint 110, 130, or 150.

When the wearer bends the elbow, that is, when the elbow rotates upward, the elbow joint 130 consequently rotates upward to be bent and the elbow wire 231 connected to the elbow joint 130 is loosened. Accordingly, the tension of the elbow wire 231 is decreased, and the controller 600 that receives a tension value from the pressure sensor 350 drives the elbow driving unit 530 to wind the elbow driving unit wire 233. Therefore, winding force acts on the elbow wire 231, and upward winding force acts on the elbow joint 130, and as a result, assistance force is applied to allow the worker to easily lift the weight. The winding force by the elbow wire 231 acts on a pair of elbow joints 130 with force of the same magnitude.

Meanwhile, the respective driving units 510, 530, and 550 may preferably actuate the joints to unwind the corresponding wires 211, 231, and 251 when the wearer rotates the joints corresponding to the respective driving units 510, 530, and 550 in the opposite direction to the winding directions of the wires 211, 231, and 251.

Returning to the cases of the elbow wire 231 and the elbow joint 130 again, when the elbow joint 130 is unbent, that is, when the elbow joint 130 rotates downward, the elbow wire 231 is pulled and the tension is increased. Accordingly, the controller 600 unwinds the elbow driving unit wire 233 by actuating the elbow driving unit 530, and as a result, the elbow wire 231 is loosened. Therefore, it is possible to reduce the fatigue which the wearer feels in rotating the elbow joint 130.

Reference tension is set in the controller 600, and as a result, the driving units 510, 530, and 550 are preferably actuated so that the tension of the wires 211, 231, and 251 is restored to the reference tension whenever the tension of the wires 211, 231, and 251 becomes larger than or smaller than a reference tension value. The reference tension may be changed according to the work environment for the worker and the character of work.

According to the wire-driven robot having the aforementioned structure, the total weight of the robot can be reduced by decreasing the number of driving units for driving the robot, and as a result, the burden of a worker is decreased, thereby increasing the work efficiency of the worker.

Further, the number of driving units is decreased to save cost.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A wire-driven robot, comprising:
   pairs of arm parts including shoulder joints, elbow joints, and wrist joints configured to move with a motion of a wearer;
   a shoulder wire connected to the pair of shoulder joints;
   a shoulder driving unit applying a rotational force to the shoulder joints by winding or unwinding the shoulder wire in link with the motion of the wearer;
   an elbow wire connected to the pair of elbow joints;
   an elbow driving unit applying a rotational force to the elbow joints by winding or unwinding the elbow wire in link with the motion of the wearer;
   a wrist wire connected to the pair of wrist joints; and
   a wrist driving unit applying a rotational force to the wrist joints by winding or unwinding the wrist wire in link with the motion of the wearer.

2. The wire-driven robot of claim 1, wherein both ends of each wire are connected to a pair of joints corresponding thereto, respectively, and the respective driving units are connected between both ends of the wires corresponding thereto to wind or unwind the wires corresponding thereto.

3. The wire-driven robot of claim 1, further comprising:
   a supporting body of which both sides are rotatably joined with the pairs of arm parts,
   wherein each driving unit is fixed to the supporting body.

4. The wire-driven robot of claim 1, wherein each driving unit unwinds a corresponding wire when the wearer rotates the joint corresponding to each driving unit in an opposite direction to a winding direction of the corresponding wire.

5. The wire-driven robot of claim 1, wherein each driving unit winds a corresponding wire when the wearer rotates the joint corresponding to each driving unit in a direction which coincides with the winding direction of the corresponding wire.

6. The wire-driven robot of claim 1, further comprising:
   a tension detecting unit provided between one end and the other end of each wire for detecting the tension of a corresponding wire; and
   a controller actuating a corresponding driving unit to wind or unwind the corresponding wire to allow the corresponding wire to keep a predetermined reference tension when a joint connected to the wire corresponding to each tension detecting unit pivots to change the tension of the corresponding wire.

7. The wire-driven robot of claim 6, wherein:
   each tension detecting unit includes:
   a driving unit-side suspension portion of which one end is connected to the driving unit wires corresponding to each tension detecting unit;
   an arm part-side suspension portion of which one end is connected between both ends of the wire corresponding to each tension detecting unit and the other end is suspended and joined with the corresponding driving unit-side suspension portion; and
   a pressure sensor provided at a portion where the driving unit-side suspension portion and the arm part-side suspension portion contact each other to detect pressing force applied to a contact surface.

8. A wire-driven robot system wherein pairs of arm parts include shoulder joints, elbow joints, and wrist joints to move with a motion of a wearer; a shoulder wire is connected to the pair of shoulder joints; a shoulder driving unit is in link with a motion of the wearer so as to apply a rotational force to the shoulder joints by winding or unwinding the shoulder wire; an elbow wire is connected to the pair of elbow joints; an elbow driving unit is in link with a motion of the wearer so as to apply a rotational force to the elbow joints by winding or unwinding the elbow wire; a wrist wire is connected to the pair of wrist joints; and a wrist driving unit is in link with a motion of the wearer so as to apply a rotational force to the wrist joints by winding or unwinding the wrist wire.

* * * * *